April 4, 1967 T. STURIS 3,312,309
SPOT TYPE DISK BRAKE
Filed April 5, 1965 2 Sheets-Sheet 1
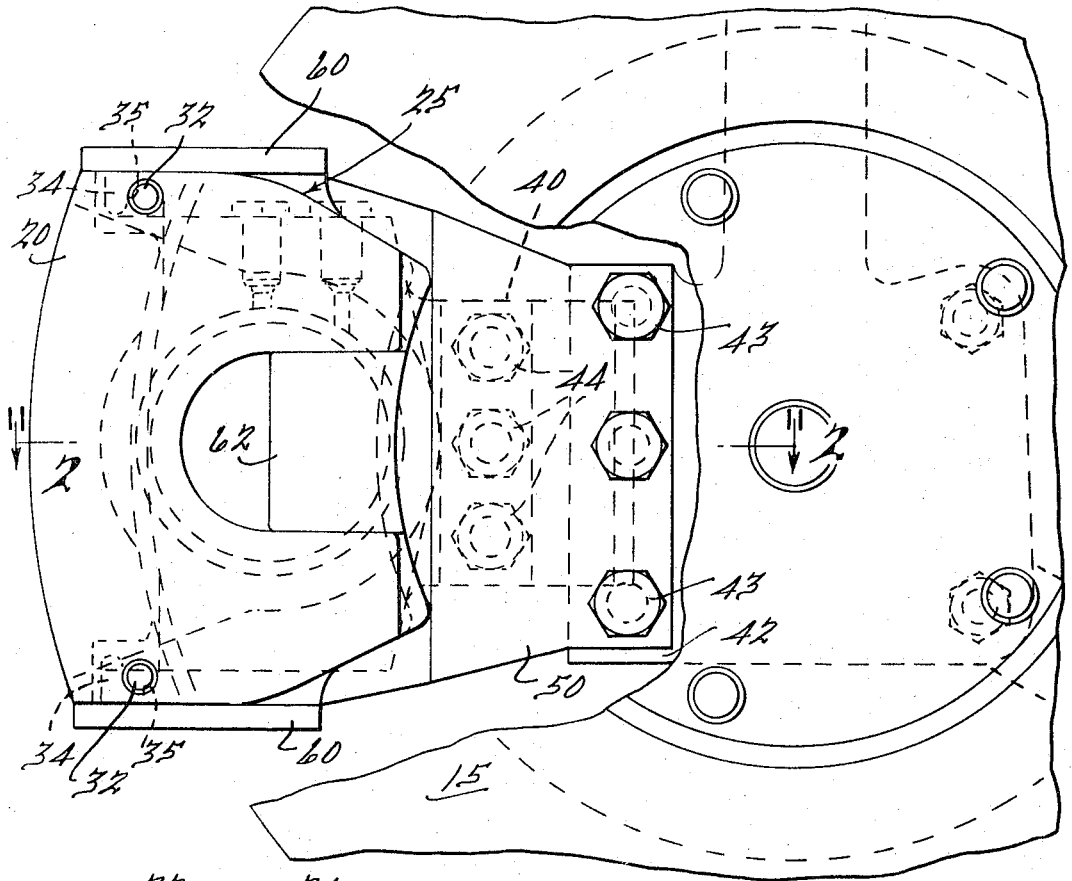
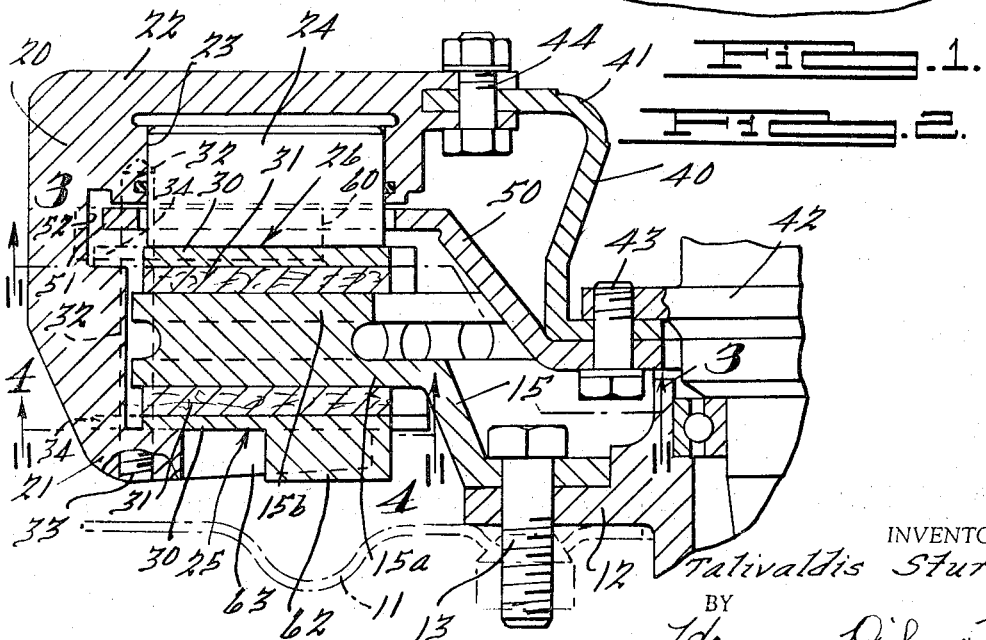
INVENTOR.
Tatitvaldis Sturis
BY
Harness, Dickey & Pierce
ATTORNEYS.

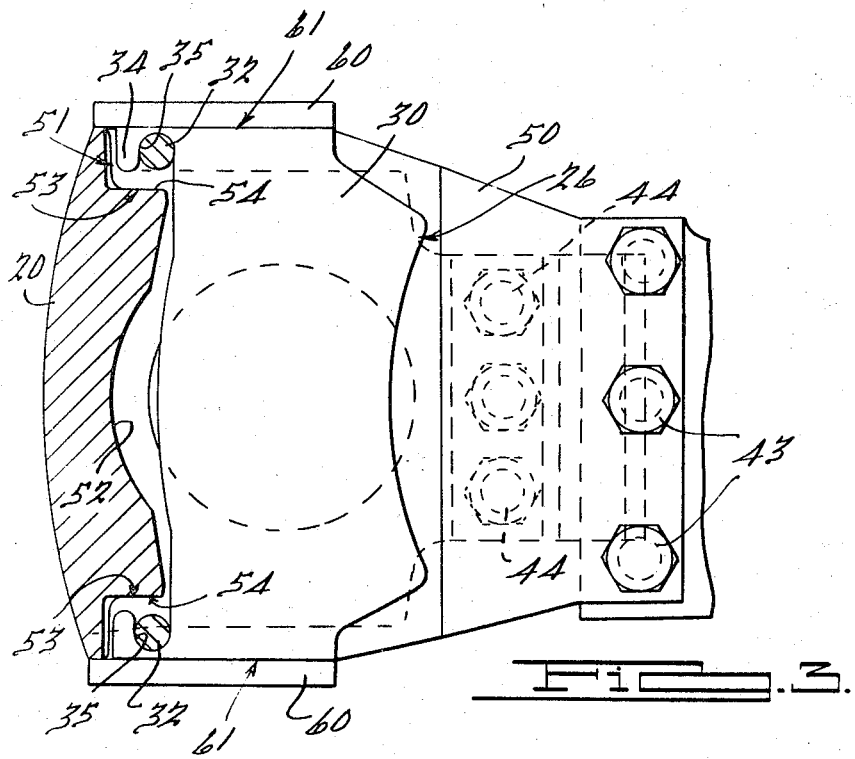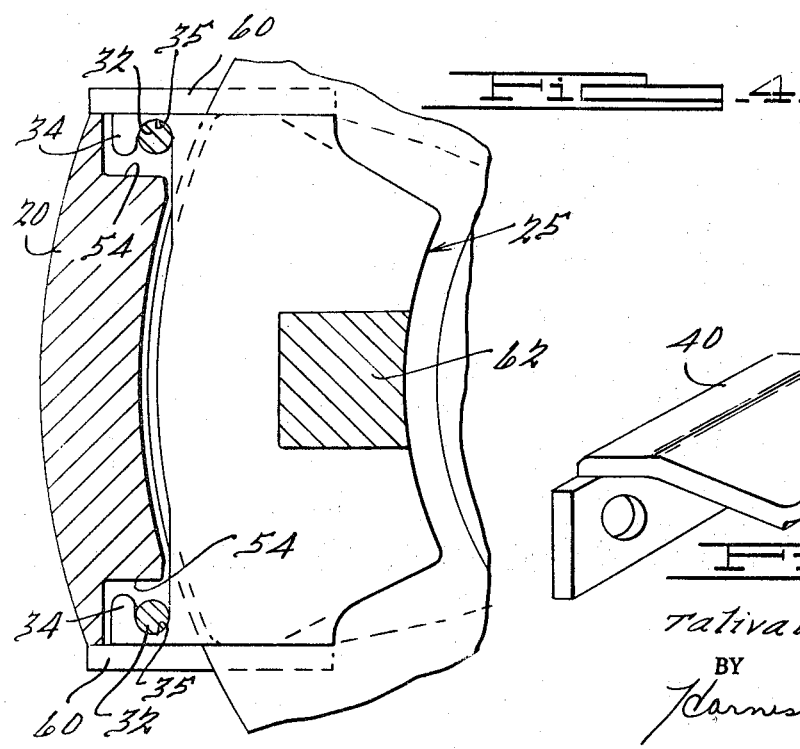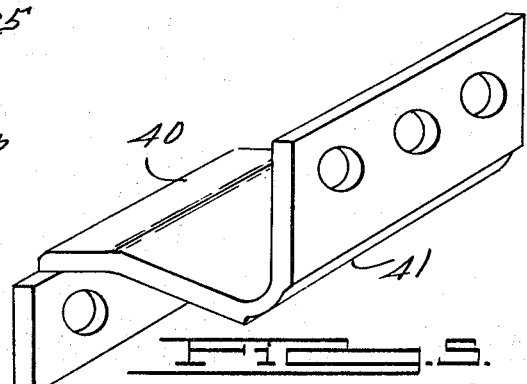

United States Patent Office 3,312,309
Patented Apr. 4, 1967

3,312,309
SPOT TYPE DISK BRAKE
Talivaldis Sturis, Plymouth, Mich., assignor to Kelsey-Hayes Company, Romulus, Mich., a corporation of Delaware
Filed Apr. 5, 1965, Ser. No. 445,332
9 Claims. (Cl. 188—73)

This invention relates to brakes for vehicles and, more particularly, to disk brakes and to improvements therein, whereby simple but effective means are provided for restraining movement of the caliper and brake shoes in a direction parallel to the plane of the brake disk while permitting the caliper to move in a direction at right angles to the plane of the brake disk.

In accordance with this invention, the caliper or yoke member is supported by a longitudinally flexible member, herein termed a "flex strap," which is flexible in the direction of the axis of the wheel and permits the caliper to float during the application of the brakes whereby the caliper may be moved by a single piston to apply one brake shoe and, through the reaction of the caliper, to actuate the other brake shoe. Also, the invention contemplates the combination with the flex strap of a torque member adapted to restrain movement of the caliper and brake shoes in a direction parallel to the plane of the brake disk while permitting a floating movement of the caliper in the direction of the axis of the wheel during the application and release of the brakes.

Thus, the invention comprises broadly the combination of means for resisting the torque forces on the caliper and brake shoes while permitting the caliper and brake shoes to move at right angles to the plane of the brake disk to effect actuation of the brake shoes.

The objects of the invention are attained by a construction comprising a longitudinally flexible strap-like member secured adjacent one end to a stationary part of the axle housing of the wheel and secured at its other end to a caliper comprising a substantially C-shaped housing or yoke member. Mounted on the caliper is a piston which actuates one brake shoe and, through the reaction of the caliper, actuates the other brake shoe. The flexible strap-like member is bendable in the direction of the axis of the wheel so as to permit movement of the caliper during actuation of the brake shoes. Also secured to a stationary part of the axle housing is a torque member provided with circumferentially spaced shoulders adapted to engage companion shoulders on the caliper to resist torque loads applied to the caliper and with right angularly extending flanges or ears adapted to engage the adjacent edges of the brake shoes to resist torque loads applied to the brake shoes. The connection between the torque member and the caliper and brake shoes is such as to permit movement of the caliper and brake shoes in the direction of the axis of the wheel during the application and release of the brakes while resisting all torque loads applied thereto.

The various objects and advantages, and the novel details of construction of one commercially practical embodiment of the invention, will become more apparent as this description proceeds, especially when considered in connection with the accompanying drawings, in which:

FIGURE 1 is an elevational view, partly broken away, of a disk brake constructed in accordance with this invention and mounted on a wheel;

FIGURE 2 is a fragmentary sectional view taken substantially on the plane indicated by line 2—2 in FIGURE 1;

FIGURE 3 is a fragmentary sectional view taken substantially on the plane indicated by line 3—3 in FIGURE 2;

FIGURE 4 is a fragmentary sectional view taken substantially on the plane indicated by line 4—4 in FIGURE 2; and FIGURE 5 is a perspective view of the flex strap.

The brake of this invention is shown as being associated with a vehicle wheel body 11 (indicated fragmentarily by dotted lines) secured to the axle flange 12 by means of studs or bolt and nut assemblies 13. Also secured to the axle flange 12, as for instance by means of the same stud or bolt and nut assemblies 13, for rotation with the wheel 11, is a brake disk 15. The brake disk 15 is of the ventilated type having spaced walls 15a and 15b.

The reference character 20 indicates a caliper-like housing or member having a leg 21 engaging one of the brake shoes. The other leg 22 of the caliper member is provided with a recess 23 forming a cylinder to slidably receive a piston 24. When fluid under pressure is admitted to the cylinder 23, the piston is moved downwardly, as viewed in FIGURE 2, and engages the adjacent brake shoe to move it against the brake disk. The reaction of this movement of the piston operates in an opposite direction to move the caliper so that the leg 21 thereof moves the other brake shoe into engagement with the brake disk. Thus, both brake shoes are actuated simultaneously by the use of a single piston.

The reference character 25 indicates one brake shoe and the reference character 26 indicates the other brake shoe.

Each brake shoe consists of a backing plate 30 carrying a friction lining 31 adapted to engage the braking surfaces 15a and 15b of the brake disk 15.

The brake shoes are slidably supported on a pair of pins 32 threaded into the caliper at one end as at 33. To accomplish this connection, each brake shoe is provided with an extension 34 forming a slot 35 which engages the pins 32.

The caliper 20 is floatingly mounted for restrained movement in the direction of the axis of the wheel by means of a longitudinally flexible member 40 in the form of a strap-like member. The strap-like member 40 is locally weakened by thinning the same as at 41 so that the bending movement of the strap-like member, herein sometimes referred to as a "flex strap," occurs generally in the area 41. One end of the flex strap 40 is secured to the nonrotatable axle flange 42 by means of bolts or the like 43, and the other end is secured by bolts or the like 44 to the caliper 20. Thus, the caliper 20 is capable of moving at right angles to the plane of the brake disk or, in other words, in the direction of the axis of the wheel. This permits movement of the caliper 20 to move the brake shoe 25 into engagement with the brake disk 15.

The reference character 50 indicates a torque member or plate secured at one end to the fixed axle part 42 as, for instance, by the bolts 43. The outer end of the torque member 50 is somewhat fan shaped and has its outer edge 51 extending into a recess 52 in the caliper 20. The other edge 51 of the torque member 50 is provided with a pair of circumferentially spaced shoulders 53 which engage spaced shoulders 54 at each end of the slot or recess 52 formed in the caliper 20. The engagement of the shoulders 53 and 54 resists relative torque movement between the torque member 50 and the caliper member 20. However, the shoulders 53 and 54 have a sliding engagement which permits movement of the caliper in the direction of the axis of the wheel or, in other words, at right angles to the torque movement.

The torque member 50 is provided with a pair of right angularly extending flanges or shoulders 60 which engage the adjacent edges 61 of the backing plate 30 of the brake shoe 26 to resist torsional movement of this brake shoe. The backing plate 30 of the brake shoe 25 is provided with a lug or projection 62 which engages a radial slot 63 in the caliper leg 21 so as to resist torsional movement of this brake shoe.

Thus, it will be seen that while the caliper is floatingly supported by the flex strap 40 for movement at right angles to the plane of the brake disk, it is restrained from movement in a direction parallel to the plane of the brake disk while permitting said floating movement.

During actuation of the brake, the flex strap 40 twists slightly and thus permits a slight movement of the caliper 20 and brake shoes which imparts a servo action to the brake.

The construction heretofore described provides a very efficient disk brake which is so reduced in the number and character of its component parts as to approach the ultimate in structural simplicity to thereby create an economy in its manufacture, installation and maintenance costs.

While one commercially practical embodiment of the invention has been described and illustrated herein somewhat in detail, it will be understood that various changes may be made as may come within the purview of the accompanying claims.

What is claimed is:

1. A disk brake for braking a rotary disk including a stationary torque plate disposed generally parallel to the disk and having a pair of spaced shoulders disposed perpendicular to the disk, a caliper held against rotation by direct engagement with said torque plate shoulders and having a fluid motor portion on one side of the disk and a reaction portion on the other side of the disk, a first brake shoe disposed between said torque plate and the disk and engageable at the opposite ends thereof with said shoulders to transmit all of its braking torque to said shoulders, said first brake shoe beinp motivated by said fluid motor portion, a second brake shoe disposed between the disk and said reaction portion and motivated by said reaction portion, the braking torque of said second brake shoe being absorbed by said caliper, and means disposed on the side of said torque plate opposite from the disk operable to support and guide said caliper for movement generally perpendicular to the disk and operable to resist twisting of said caliper about said torque plate under the influence of said second shoe.

2. The structure set forth in claim 1 in which said last named means comprises a yieldable strap secured to a stationary part at one end thereof and to said caliper at the other end thereof.

3. The structure set forth in claim 1 in which said shoulders engage said caliper on opposite sides thereof.

4. The structure set forth in claim 1 in which said shoulders comprise flanges projecting toward the disk and wherein said flanges are engageable with said caliper on opposite sides thereof to absorb braking torque from said caliper.

5. The structure set forth in claim 1 in which said last named means comprises a yieldable metallic strap which is fastened to said torque plate.

6. The structure set forth in claim 1 including a pair of pins carried by said caliper and disposed generally perpendicular to said disk, said first shoe being supported on said pins for movement toward and away from the disk.

7. The structure set forth in claim 1 in which said fluid motor portion is disposed on the side of said torque plate opposite from said disk and said torque plate is provided with an opening through which a piston carried by said fluid motor portion projects into engagement with said first brake shoe.

8. The structure set forth in claim 1, wherein said last named means comprises a yieldable strap which is operable to restrain twisting movement of said caliper but which is subject to slight twisting to provide a self-energizing braking action.

9. The structure set forth in claim 1 in which said last named means cooperates with said torque plate in restraining rotation of said caliper with said disk.

References Cited by the Examiner

UNITED STATES PATENTS

| 3,186,517 | 6/1965 | Harrison | 188—23 |
| 3,220,512 | 11/1965 | Coatalen | 188—73 |

FOREIGN PATENTS

| 1,345,576 | 11/1963 | France. |
| 1,353,793 | 1/1964 | France. |
| 1,379,032 | 10/1964 | France. |

MILTON BUCHLER, *Primary Examiner.*

G. E. A. HALVOSA, *Assistant Examiner.*